United States Patent
Campos et al.

(10) Patent No.: US 8,559,783 B2
(45) Date of Patent: Oct. 15, 2013

(54) MOUNTING ASSEMBLY FOR FIBER OPTIC EQUIPMENT

(75) Inventors: Cesar Alejandro de los Santos Campos, Reynosa (MX); Andrew P. Cowen, Keller, TX (US); Fernando Esparza Diaz, Reynosa (MX); Enrique Miguel Herrera de Hoyos, Reynosa (MX); Juan Garcia Martinez, Reynosa (MX); Jaime Manzo Rodriguez, Reynosa (MX); Alan W. Ugolini, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 571 days.

(21) Appl. No.: 12/770,960

(22) Filed: Apr. 30, 2010

(65) Prior Publication Data
US 2010/0278500 A1   Nov. 4, 2010

Related U.S. Application Data

(60) Provisional application No. 61/174,217, filed on Apr. 30, 2009.

(51) Int. Cl.
*G02B 6/00* (2006.01)

(52) U.S. Cl.
USPC ............................................ 385/135; 385/134

(58) Field of Classification Search
USPC ................................................ 385/135, 134
See application file for complete search history.

(56) References Cited

U.S. PATENT DOCUMENTS

| | | | | |
|---|---|---|---|---|
| 5,840,145 | A * | 11/1998 | Schmidt et al. | 156/272.4 |
| 7,601,922 | B2 * | 10/2009 | Larsen et al. | 174/481 |
| 2006/0018622 | A1 * | 1/2006 | Caveney et al. | 385/135 |

* cited by examiner

*Primary Examiner* — Omar Rojas
(74) *Attorney, Agent, or Firm* — John H. Vynalek (57) ABSTRACT

A mounting assembly for mounting fiber optic equipment to a cable tray is disclosed. The mounting assembly includes a support frame adapted to attach to fiber optic equipment. A mounting device attaches to the support frame. The mounting device is adapted to removably attach the support frame and, thereby, the fiber optic equipment to the cable tray.

6 Claims, 11 Drawing Sheets

MOUNTING ASSEMBLY FOR FIBER OPTIC EQUIPMENT

CROSS-REFERENCE TO RELATED APPLICATIONS

This application claims the benefit of priority under 35 U.S.C. §119(e) of U.S. Provisional Application Ser. No. 61/174,217 with a filing date of Apr. 30, 2009 the content of which is relied upon and incorporated herein by reference in its entirety.

BACKGROUND

The technology of the disclosure relates to a fiber optic apparatus, and more particularly to a mounting assembly for mounting fiber optic equipment to a cable tray.

Benefits of optical fiber use include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points at which it is necessary to link optical fibers in order to provide "live fiber" from one connection point to another connection point. In this regard, fiber optic equipment is located in data centers or central offices to support such interconnections.

The fiber optic equipment is typically located and mounted in equipment racks. Fiber optic cables, particularly fiber optic cables containing multiple optical fibers, route to and between the equipment racks to allow for such interconnections to the equipment mounted in the particular equipment rack. The fiber optic cables may route to and between the equipment racks in cable trays or raceways mounted overhead or in a sub-floor beneath a raised floor of the data center or central office.

However, available space in a data center or central office for equipment racks may be limited and/or very expensive. Therefore, a common problem in telecommunications systems with respect to data center and central office designs, is space management. Designing the data center and central office so as to position the necessary fiber optic equipment and/or components in a way to maximize the use of equipment rack space, while, at the same time, limiting the quantity of equipment racks is desired. In this way, the use of the available data center and central office space, including floor space, may be optimized.

SUMMARY

Embodiments disclosed in the detailed description include a mounting assembly for mounting fiber optic equipment to a cable tray. The mounting assembly includes a support frame adapted to attach to fiber optic equipment. A mounting device attaches to the support frame. The mounting device is adapted to removably attach the support frame and, thereby, the fiber optic equipment to the cable tray.

A further embodiment includes a mounting assembly for fiber optic equipment having a mounting plate adapted to attach to a cable tray and a support frame adapted to connect to fiber optic equipment and configured to removably attach to the mounting plate. When the support frame is removably attached to the mounting plate when attached to the cable tray, the cable tray supports the fiber optic equipment connected to the support frame.

A further embodiment includes a mounting assembly for mounting fiber optic equipment to a cable tray having a support frame and at least one tray bracket. The support frame has a top member with at least one attachment slot, and at least one side member adapted to attach the support frame to fiber optic equipment. The at least one tray bracket has a channel and a tab. The channel and the tab form a notch, wherein the at least one tray bracket at the channel is adjustably attached to the support frame at the at least one attachment slot. The notch is configured to receive a cross member of the cable tray, and the tab extends over the cross member to removably attach the tray bracket, and thereby, the support frame and the fiber optic equipment to the cable tray.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the embodiments. The accompanying drawings are included to provide a further understanding of the embodiments, and are incorporated into and constitute a part of this specification. The drawings illustrate various embodiments and together with the description serve to explain the principles and operation of the embodiments.

DETAILED DESCRIPTION

Reference will now be made in detail to the embodiments, examples of which are illustrated in the accompanying drawings, in which some, but not all embodiments are shown. Indeed, the embodiments may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

To optimize space management in a central office or data center, it is desirable to develop ways in which some fiber optic equipment or components may be located, positioned, and/or mounted in the data center or central office so as not to occupy any equipment rack space. Typically in such case, such equipment or component may be referred to as being "zero-U," which means that they take up zero or no units of space in the equipment rack. Further space management optimization may be accomplished by locating or mounting the zero-U equipment or components in a manner to utilize already existing structures in the data center or central office. In this way, those existing structures may thereby be transformed into multiple-use structures.

One such existing structure is the cable tray or raceway. Fiber optic cables which route to or between the equipment racks are typically routed using a cable tray or raceway. As used in this document, the term "cable tray" shall be understood to mean, without limitation, any wire tray, raceway, passageway, ladder, ladder rack, channel, mesh, basket and/or any other structure, system or means used to support, organize, and/or distribute fiber optic cables or optical fibers between locations. The cable tray may be at least partially located above the fiber optic equipment rack in an overhead installation or orientation in the data center or central office. Additionally or alternatively, the cable tray may be at least partially located below the fiber optic equipment rack, which may be in a space under the floor of the data center or central office, for example in a sub-floor. As used herein, the term "fiber optic equipment rack" shall mean, without limitation, any structure in which or on which fiber optic equipment, components, or hardware are located and/or mounted, other than a cable tray.

The terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive optical fiber is ClearCurve® Multimode fiber commercially available from Corning Incorporated.

The designation "U" refers to a standard equipment shelf size of a fiber optic equipment rack or a cabinet. This may also be referred to as "RU." For example, an equipment rack may support 42 1 U-sized shelves, with "U" equal to a standard 1.75 inches in height and nineteen (19) inches in width. In certain applications, the width of "U" may be twenty-three (23) inches.

Figure 1:
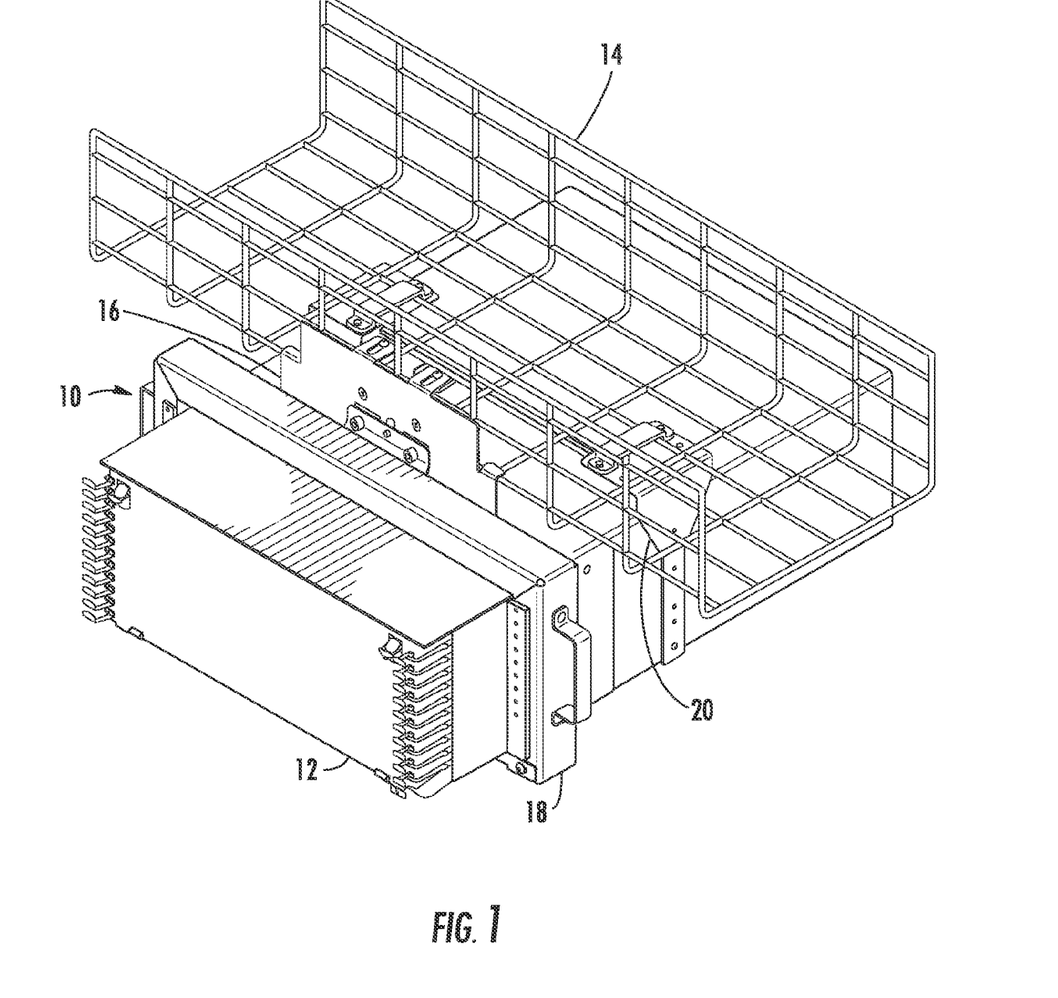
FIG. 1 is a top, perspective view of an exemplary embodiment of a mounting assembly mounting 4 U-size fiber optic equipment to a wire mesh cable tray.
Figure 2:
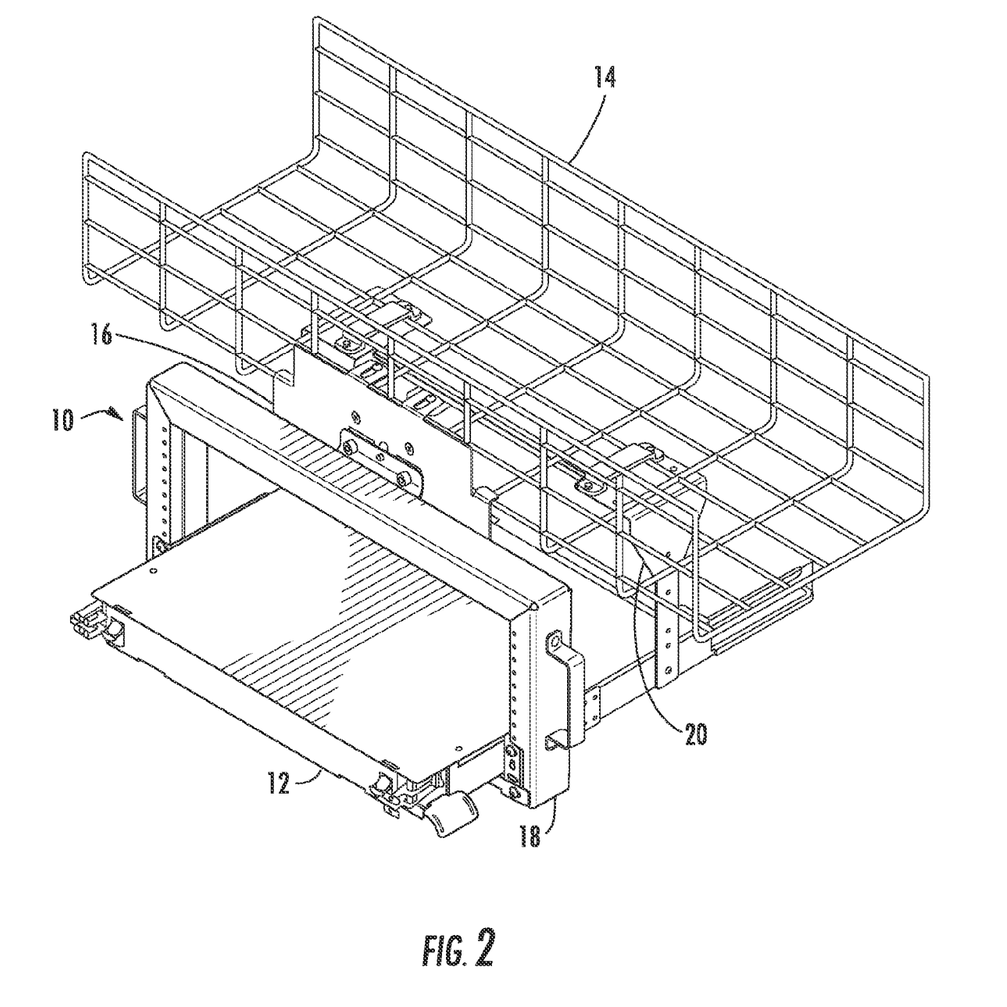
FIG. 2 is a top, perspective view of an exemplary embodiment of the mounting assembly of FIG. 1 mounting 1 U-size fiber optic equipment to a wire mesh cable tray.

Referring now to FIGS. 1 and 2, there is shown an embodiment of a mounting assembly 10 for removably mounting fiber optic equipment 12 to a cable tray 14. In FIG. 1, the fiber optic equipment 12 is shown as being 4 U size, while in FIG. 2 the fiber optic equipment is shown as being 1 U size. In either case, the same mounting assembly 10 may be used. Additionally, the same mounting assembly 10 may be used for different U size fiber optic equipment 12, and for multiple 1 U fiber optic equipment 12. As an example, one mounting assembly 10 may be used to removably mount two 1 U size fiber optic equipment to the cable tray 14. The mounting assembly 10 has a a mounting device in the form of a mounting plate 16, a support frame 18 and an adjustable bracket assembly 20. In FIGS. 1 and 2, the mounting plate 16 is shown attached to a cable tray 14 in the form of a wire mesh tray, but the mounting plate 16 may be attached to any type of cable tray, for example, without limitation, a ladder tray. The support frame 18 is connected to fiber optic equipment 12 and removably attached to the mounting plate 16. Thus, the cable tray 14 supports the fiber optic equipment 12 connected to the support frame 18 when the support frame 18 is removably attached to the mounting plate 16. Although in FIGS. 1 and 2, the fiber optic equipment 12 is shown as U-shaped enclosures, any type or shape of fiber optic equipment, performing any function may be supported in this manner.

Figure 3A:
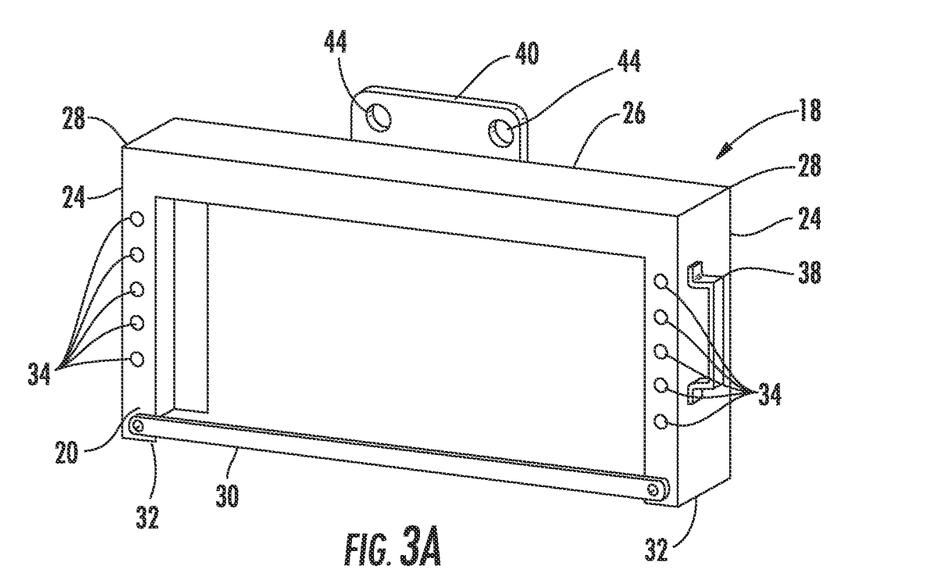
FIGS. 3A and 3B are detail, perspective views of a support frame front side and support frame back side, respectively, for use in a mounting assembly of FIGS. 1 and 2.
Figure 3B:
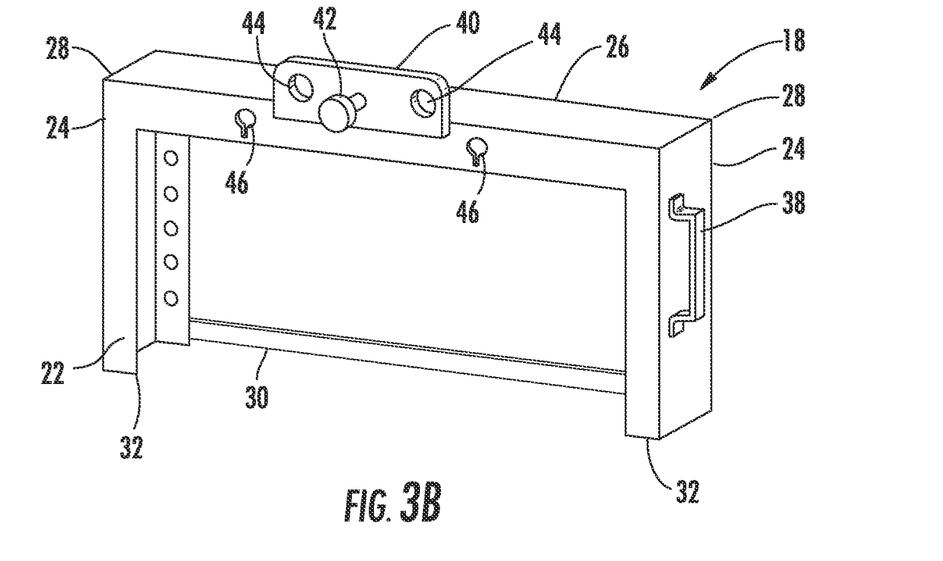

Referring now to FIGS. 3A and 3B, there is shown a detail of the support frame 18. FIG. 3A shows a detail of the frame front side 21, while FIG. 3B shows a detail of the frame back side 22. The support frame 18 has two equipment connection members 24 connected to and extending from a top member 26 at each end 28 of the top member 26 in a generally downwardly direction to form a generally inverted "U" shape. Although, in the embodiment shown in FIGS. 3A and 3B, the equipment connection members 24 and the top member 26 are shown constructed from one or more channel members, any type or form of construction of the support frame 18 may be used. Additionally, the support frame 18 may be constructed of metal or any other suitable material or composition. A bottom support 30 attaches to the bottoms 32 of each equipment connection member 24. Any suitable fastener, such as screws, rivets and the like, may be used to attach the bottom support 30 to the equipment connection member 24. Additionally or alternatively, the bottom support 30 may be welded to the equipment connection member 24. Although the bottom support 30 is shown attached to the frame front side 21, alternatively the bottom support may be attached to the frame back side 22.

Each equipment connection member 24 has several equipment connection apertures 34 formed therethrough on the frame front side 21. The equipment connection apertures 34 may be used to connect the fiber optic equipment 12 to the support frame 18. The several equipment connection apertures 34 are provided and spaced along the equipment connection members 24 to allow for the connection of different sizes and types of fiber optic equipment 12. Additionally, each equipment connection member 24 has a handle 38. The handles 38 facilitate the carrying and manipulating of the support frame 18, particularly when the fiber optic equipment 12 is connected to the support frame 18, and when the support frame 18 is being removably attached to the mounting plate 16.

A frame hanger bracket 40 extends from the top member 26 at the frame back side 22. In FIGS. 3A and 3B the frame hanger bracket 40 is illustrated as being generally centered along the length of the top member 26. The support frame 18 may be removably attached to the mounting plate 16 using the frame hanger bracket 40. A frame self-clinching fastener 42 extends from the frame hanger bracket 40 at the frame back side 22. The frame self-clinching fastener 42 is configured to insert into the plate keyhole 60 described with respect to FIGS. 4A and 4B, below. In this way, the frame self-clinching fastener 42 may be used to removably attach the support frame 18 to the mounting plate 16. The hanger bracket 40 may include fastener holes 44 which may be used for additional attachment of the support frame 18 to the mounting plate 16. Additionally, the top member 26 may have two frame keyholes 46 at the frame back side 22. The frame keyholes 46 may be located in a spaced relationship so as to match-up with the two plate self-clinching fasteners 62 described with respect to FIGS. 4A and 4B, below. Each frame keyhole 46 may be configured to receive a plate self-clinching fastener 62. Thus, the frame keyholes 46 and the plate self-clinching fasteners 62 may also be used to removably attach the support frame 18 to the mounting plate 16 and provide additional support for the support frame 18 and the fiber optic equipment 12 connected thereto.

Figure 4A:
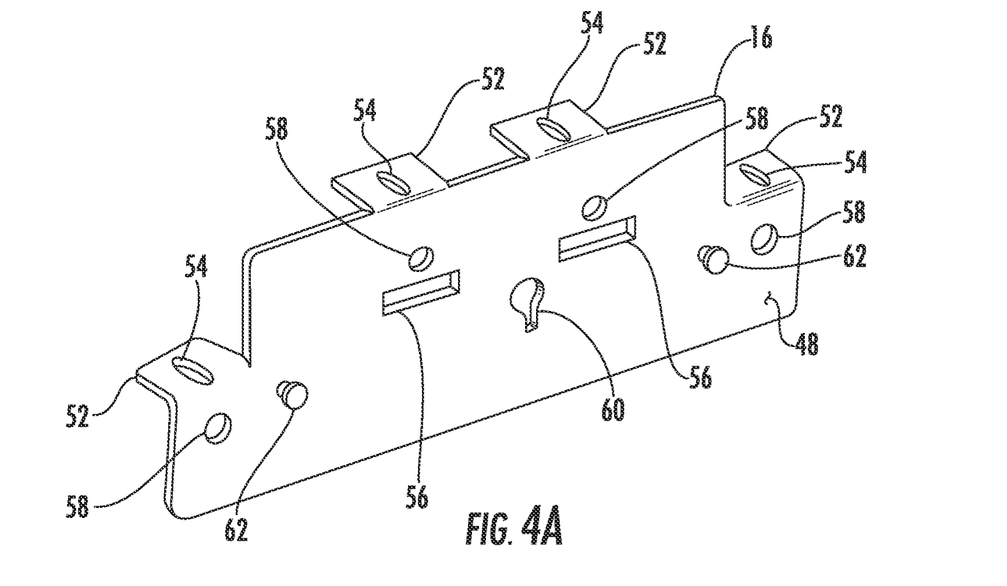
FIGS. 4A and 4B are detailed, perspective views of a mounting plate front side and mounting plate back side, respectively, for use in a mounting assembly of FIGS. 1 and 2.
Figure 4B:
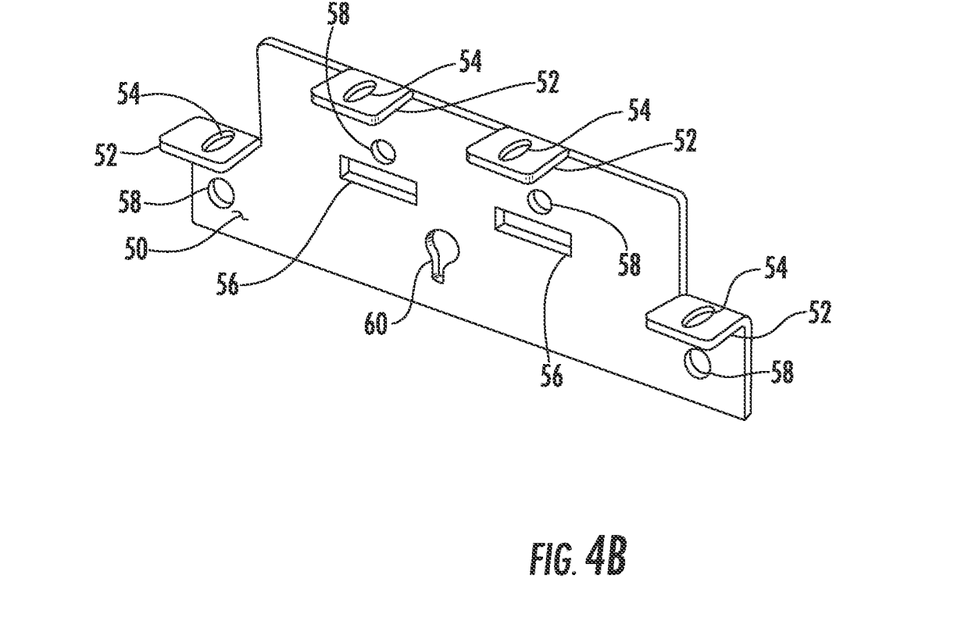

Referring now to FIGS. 4A and 4B, there is shown a detail of the mounting plate 16 according to an embodiment. FIG. 4A shows a front perspective view of the mounting plate 16. FIG. 4B shows a rear perspective view of the mounting plate 16. The mounting plate 16 may be any construction, but is shown in FIGS. 4A and 4B as a generally flat plate. As such, the mounting plate 16 may have two sides. The plate front side 48 shown in FIG. 2A and the plate back side 50, which is shown in FIG. 2B. Mounting tabs 52 extend toward the plate back side 50. Each mounting tab 52 is shown with mounting slots 54. The mounting slots 54 are configured to receive fasteners therethrough to attach the mounting tabs 52 to lock brackets 64, 66 (not shown in FIGS. 4A and 4B). The mounting tabs 52 and lock brackets 64, 66 may be used to attach the mounting plate 16 to the cable tray 14. Lock bracket slots 56 and lock bracket holes 58 provided to allow fastening of larger sized or extended lock brackets 66 to the mounting tabs 52, as will be further described below. The mounting plate 16 may be constructed of metal or any other suitable material or composition.

A plate keyhole 60 extends through the mounting plate 16 between the plate front side 48 and the plate back side 50. The plate keyhole 60 is configured to receive the frame self-clinching fastener 42 extending from the support frame 18 and/or from the fiber optic equipment 12. In this manner, the support frame 18 and/or the fiber optic equipment 12 may be removably attached to the mounting plate 16. Although only one plate keyhole 60 is shown in FIGS. 4A and 4B, any number of plate keyholes 60 may be included. Two plate self-clinching fasteners 62 extend from the front side 48. The plate mounting self-clinching fasteners 62 are configured to be received by the frame keyholes 46 or other apertures in the support frame 18 and/or the fiber optic equipment 12. The plate self-clinching fasteners 62 may provide additional or alternative support and stability to the support frame 18 and/or the fiber optic equipment 12. Although two plate self-clinching fasteners 62 are shown in FIG. 4A, any number of plate self-clinching fasteners 62 or no plate self-clinching fasteners 62 may be used.

Figure 5:
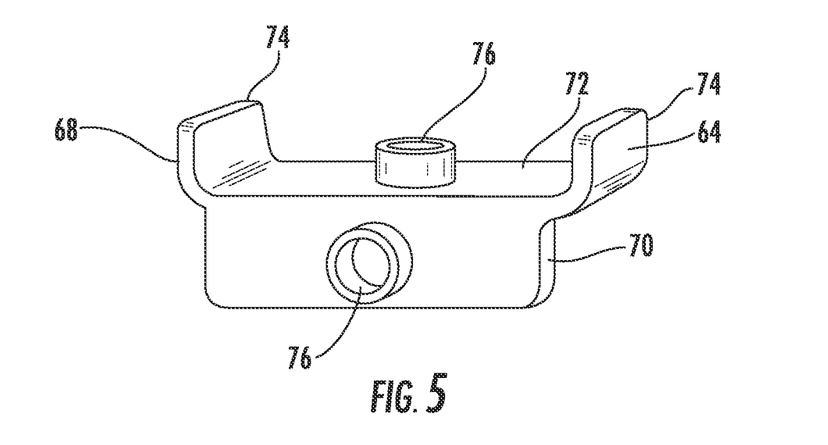
FIG. 5 is a detail view of a locking bracket for use with the mounting plate shown in FIGS. 4A and 4B.
Figure 6:
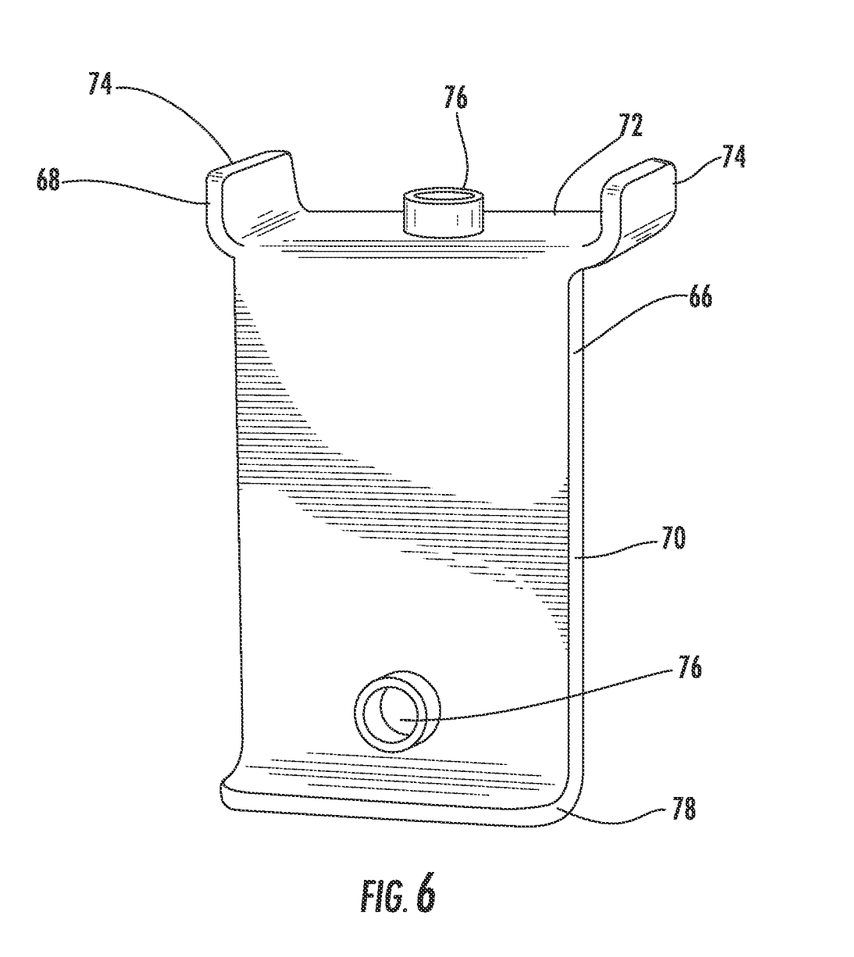
FIG. 6 is a detail view of an extended locking bracket for use with the mounting plate shown in FIGS. 4A and 4B.

Referring now to FIGS. 5 and 6, there are shown details of lock bracket 64 and extended lock bracket 66. The lock bracket 64 may be used for attaching the mounting plate 16 to the cable tray 14. The extended lock bracket 66 also may be used to attach the mounting plate 16 to the cable tray 14 where the cable tray 14 is a ladder tray. Both the lock bracket 64 and extended lock bracket 66 have a tab support 68 for receiving the mounting tab 52 of the mounting plate 16 and a base 70 for connecting to the mounting plate 16. The tab support 68 may be formed with a seat 72 and raised sides 74. Fastener receiving holes 76 may be located in the base 70 and the seat 72. The fastener receiving holes 76 may be tapped so as to receive a threaded fastener. As shown in FIG. 6, the extended lock bracket 66 may have a longer base 70 with a mounting plate insert 78 angled from the base 70.

Figure 7:
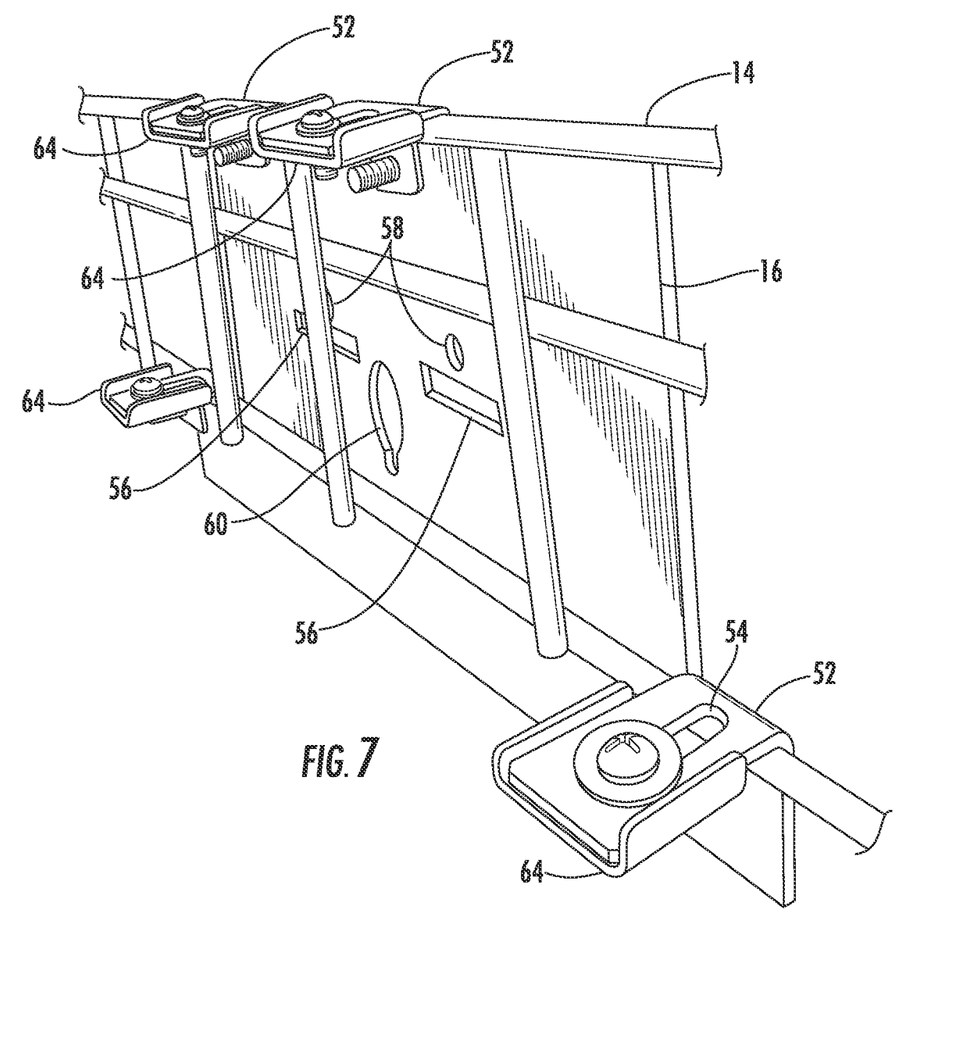
FIG. 7 is a rear, perspective view of the mounting plate of FIGS. 4A and 4B shown attached to a cable tray.

The lock bracket 64 and extended lock bracket 66 attach the mounting plate 16 to the cable tray 14, by securing or clamping a portion of the cable tray 14 between the lock bracket 64 or extended lock bracket 66 and the mounting tab 53. FIG. 7 illustrates a detail of the mounting plate 16 attached to the cable tray 14 where the cable tray 14 is a wire tray. A horizontal portion of the cable tray 14 positions between mounting tab 52 and the lock bracket 64. A fastener, such as a threaded bolt or attachment plunger, is inserted through the mounting slot 54 and into the fastener receiving hole 76 in the tab support 68. The mounting slot 54 provides for travel of the lock bracket 64 to allow for adequate positioning to accommodate the horizontal portion of the cable tray 14. The fastener may then be tightened to clamp the horizontal portion of the cable tray 14 between the mounting tab 52 and the lock bracket 64. In this way, the fastener, such as the threaded bolt or attachment plunger, provides pressure on the cable tray 14 to clamp the cable tray 14 between the fastener and the mounting tab 52 to removably attach the mounting plate 16 to the cable tray 14 at the back side. Although not shown in FIG. 7, when attaching the mounting plate 16 to a cable tray 14 that is a ladder tray, the extended lock bracket 66 may be used with the mounting tabs 52 at the top of the mounting plate 16. The base 70 extends such that the mounting plate insert 78 may insert into the lock bracket slot 56.

Figure 8:
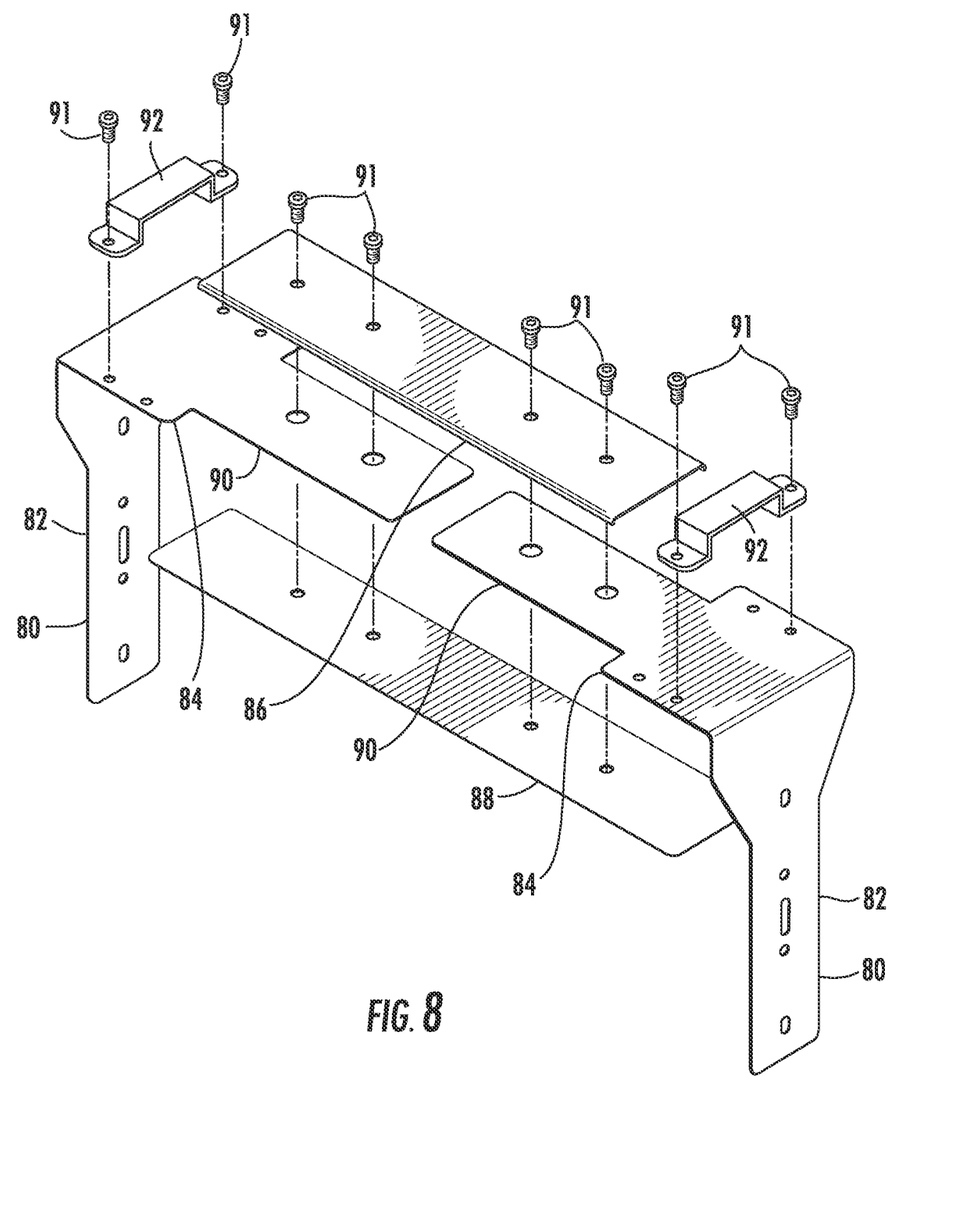
FIG. 8 is an exploded, perspective view of an adjustable bracket assembly of FIGS. 1 and 2.

Referring now to FIG. 8, there is illustrated an exploded, perspective view of the adjustable bracket assembly 20. The adjustable bracket assembly 20 may be used to provide additional support for and stability to the fiber optic equipment 12 mounted to the cable tray 14. In this embodiment, there are shown two side brackets 80, formed in an inverted "L" shape, having a leg 82 and a top section 84. The side brackets 80 attach to the sides of the fiber optic equipment 12 at the legs 82 as shown in FIGS. 1 and 2. Leg mounting apertures 86 are arranged on the leg 82 to accommodate the attachment of the side bracket 80 to different sizes of fiber optic equipment 12. Any suitable fastener, for example screws, and the like, may be used to attach the side bracket 80 to the fiber optic equipment 12. Upper connection plate 86 and lower connection plate 88 may be used to attach one side bracket 80 to another side bracket 80. The upper connection plate 86 is positioned on the top of an extended portion 90 of the top section 84. The lower connection plate 88 is positioned to the bottom of the extended portion 90 of the top section 84. Screws 91 or another suitable fastener may be inserted through the upper connection plate 86 and the extended portions 90 and into the lower connection plate 88. The upper connection plate 86 may be secured to the lower connection plate 88 with the extended portions 90 of the side brackets 80 sandwiched therebetween. In this manner, the two side brackets may be connected together 80. Tray brackets 92 may then be used to attach the side brackets 80 to the cable tray 14 (not shown in FIG. 8). Screws 91, or any other suitable fastener, may be used to attach the tray brackets 92 to the top section 84 of the side brackets 80 with the portion of the cable tray 14 between the tray brackets 92 and the side brackets 80 as is shown in FIGS. 1 and 2.

Figure 9:
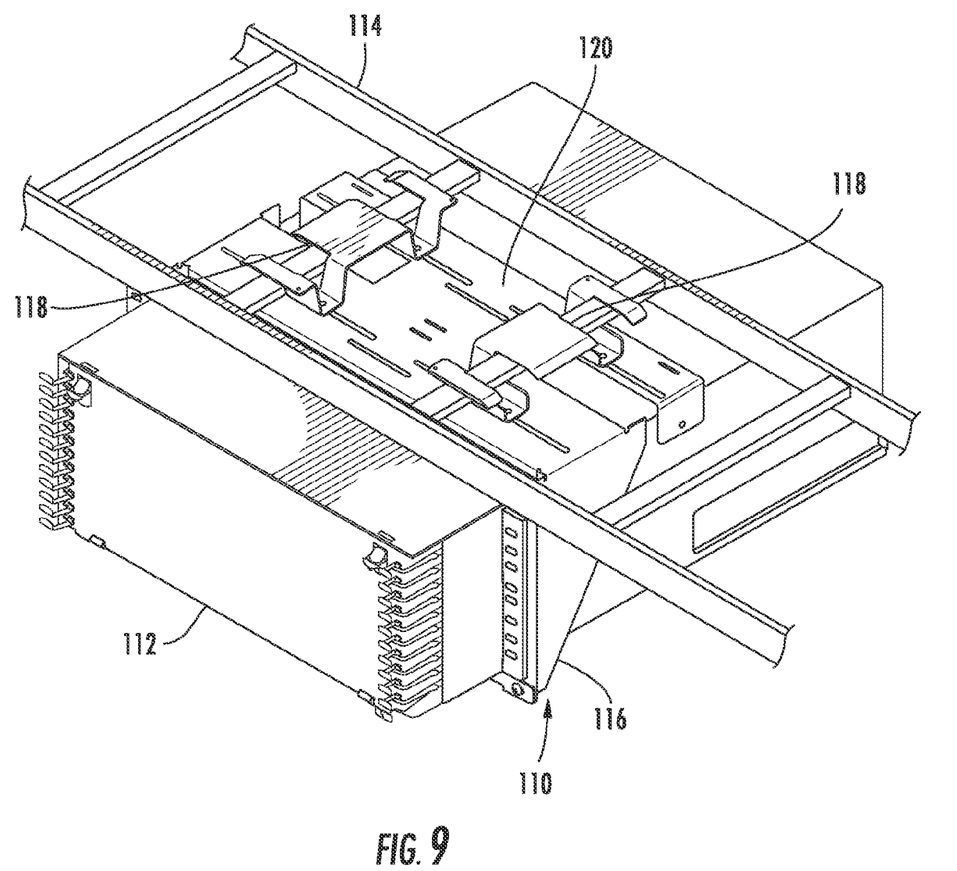
FIG. 9 is a top, perspective view of an exemplary embodiment of a mounting assembly mounting 4 U-size fiber optic equipment to a ladder-type cable tray.

Other embodiments of mounting assemblies are possible. FIGS. 9-12 illustrate an embodiment of a mounting assembly 110. Referring to FIGS. 1 and 2, there is shown an embodiment of a mounting assembly 110 for removably mounting fiber optic equipment 12 to a cable tray 14. In FIG. 9, the fiber optic equipment 12 is shown as being 4 U size, while in FIG. 10 the fiber optic equipment is shown as being 1 U size. In either case, the same mounting assembly 110 may be used. Additionally, the same mounting assembly 110 may be used for different U size fiber optic equipment 112, and for multiple 1 U size fiber optic equipment 112. As an example, one mounting assembly 110 may be used to removably mount two 1 U size fiber optic equipment to the cable tray 114.

Figure 10:
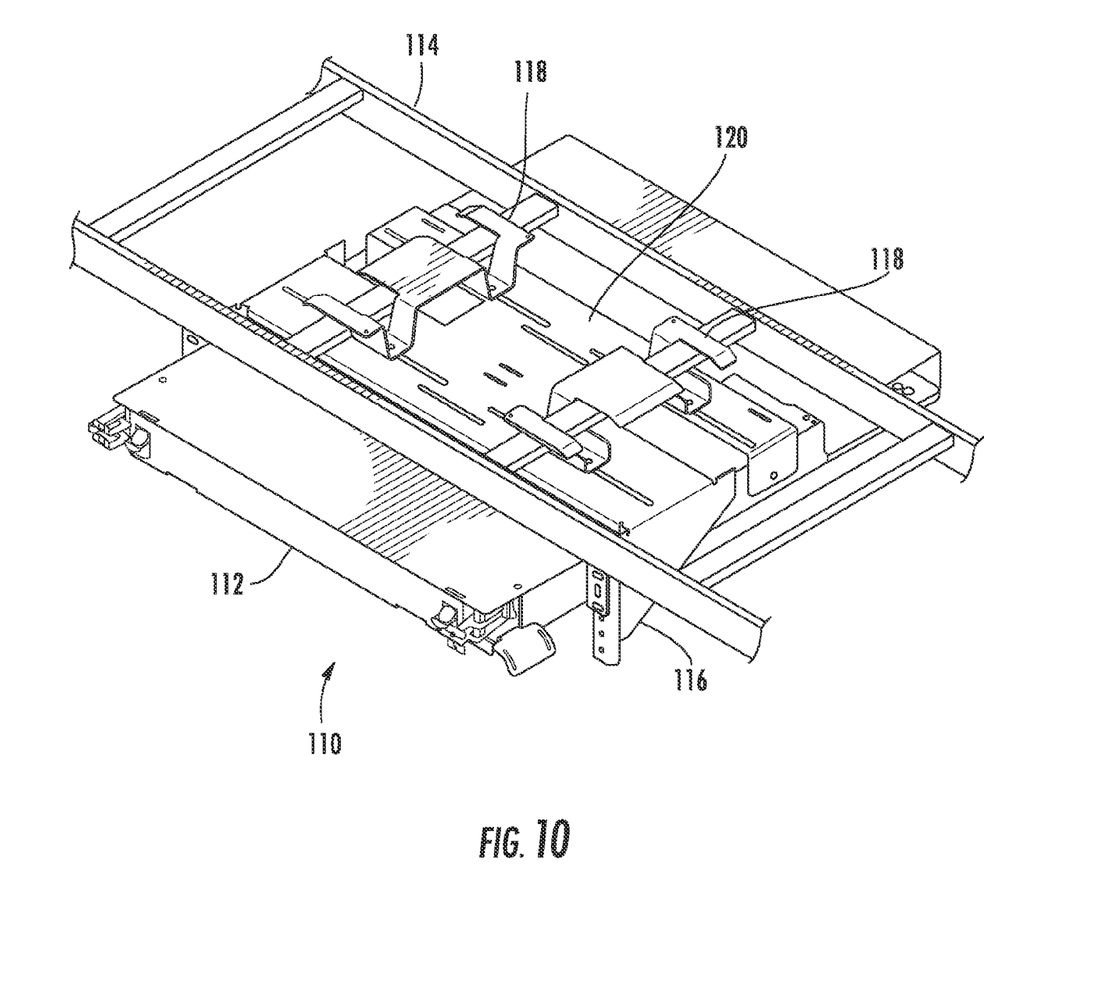
FIG. 10 is a top, perspective view of an exemplary embodiment of the mounting assembly of FIG. 9 mounting 1 U-size fiber optic equipment to a ladder-type cable tray.

The mounting assembly 110 has a support frame 116 and a mounting device in the form of a tray bracket 118. In FIGS. 9 and 10, the fiber optic equipment 112 is shown attached to a cable tray 114 in the form of a ladder tray, but the mounting assembly 110 may be used to attach the fiber optic equipment 114 to any type of cable tray, for example, without limitation, a wire mesh tray. The support frame 116 attaches to the sides of fiber optic equipment 112. The tray brackets movably attach to the support frame 116 and the cable tray 114. In this manner, the fiber optic equipment 112 may be removably attached to the cable tray 114.

Figure 11:
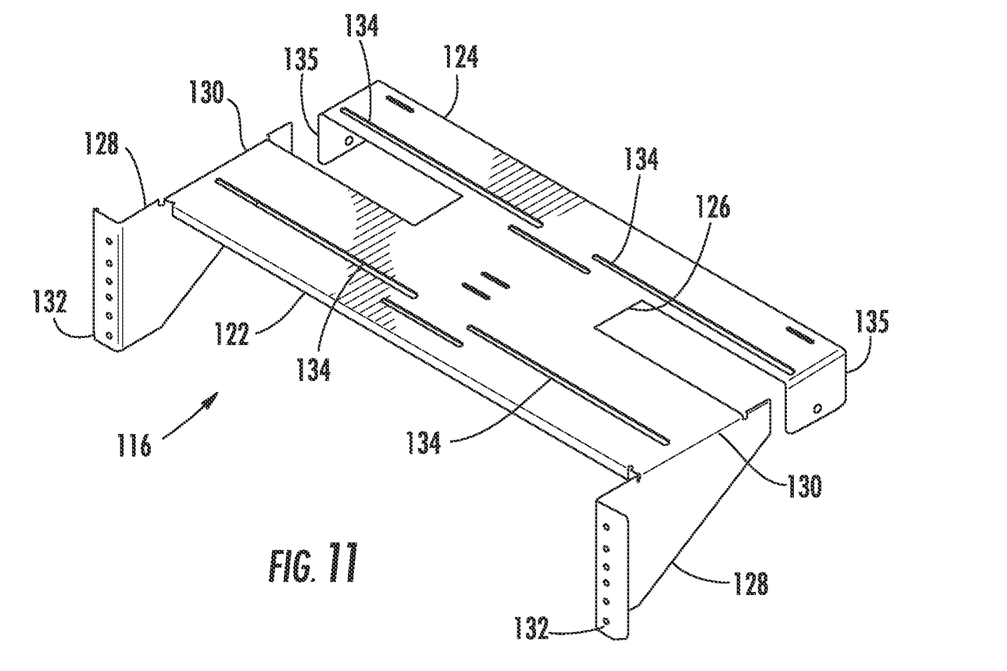
FIG. 11 is a top, perspective view of a support frame for use in a mounting assembly of FIGS. 9 and 10.

Referring now to FIG. 11, there is shown a detail of the support frame 116. The support frame 116 has a generally flat top member 120 formed with a front section 122 and a rear section 124, connected by a middle section 126. Two triangular-shaped side members 128 extend generally downwardly from the top member 120 at opposite transverse edges 130 of the top member 120 at the front section 122. The side members 128 have attachment flanges 130 that may be used for attaching the support frame 116 to the fiber optic equipment 112. Rear brackets 135 extend downwardly from the top member 120 at the transverse edges of the top member 120 at the rear section 124. The rear brackets 135 attach to the sides of the fiber optic equipment 112 and provide additional stability of and security for the fiber optic equipment 112 when the support frame 116 is attached to the cable tray 114. Screws or any other suitable fastener may be used to attach the fiber optic equipment 112 to the support frame 116 at the attachment flanges 130 and/or at the rear brackets 135.

Figure 12:
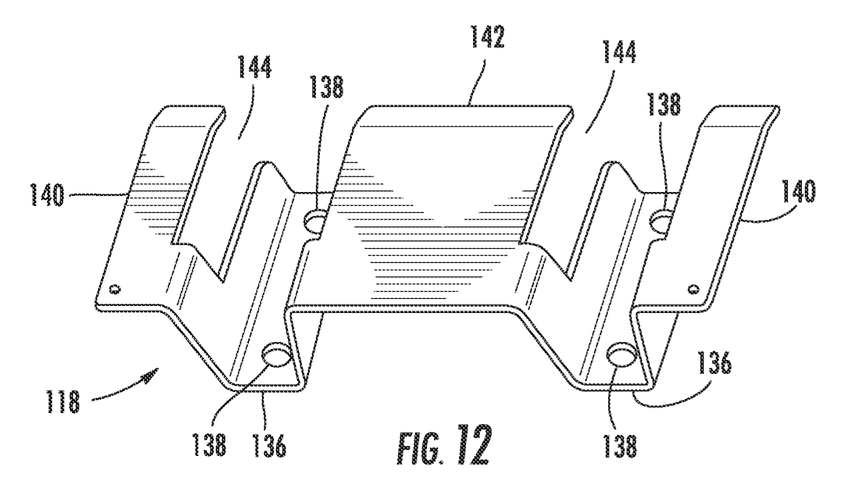
FIG. 12 is a detail, perspective view of a tray bracket for use in a mounting assembly of FIGS. 9 and 10.

The top member 120 has an arrangement of spaced mounting slots 134 cut therethrough that extend transversely generally toward each transverse edge 132. In FIG. 11, two mounting slots 134 are shown in the front section 122 and two mounting slots 134 are shown in the rear section 124. The mounting slots 134 may be arranged in a spaced configuration to coordinate with attachment holes 138 in the tray bracket 118. An embodiment of the tray bracket 118 is illustrated in FIG. 12. In FIG. 12, the tray bracket 118 is shown as having two channels 136 forming a generally "W" shape, with the channels 136 as the bottom of the "W". The attachment holes 138 for attaching the tray bracket 118 to the support frame 116 extend through the bottom of the channels 136. The top of the tray bracket is formed with two side tabs 140 and a center tab 142. The side tabs 140 and center tab 142 connect to the channels 136 in manner to form notches 144. The notches 144 are adapted to accept and or receive a cross member 146 of the cable tray 114 as shown in FIG. 10. When the cross member 146 is received through the notches 144, the side tabs 140 and the center tab 142 extend over the cross member 146 and allow the tray bracket 118 and, therefore the support frame 116 and the fiber optic equipment 112 to hang from the cable tray 114. The mounting slots 134 allow the tray bracket 118 to be adjustably positioned with respect to the support frame 116 to align with the cross members 146 of the cable tray 114.

Figure 13:
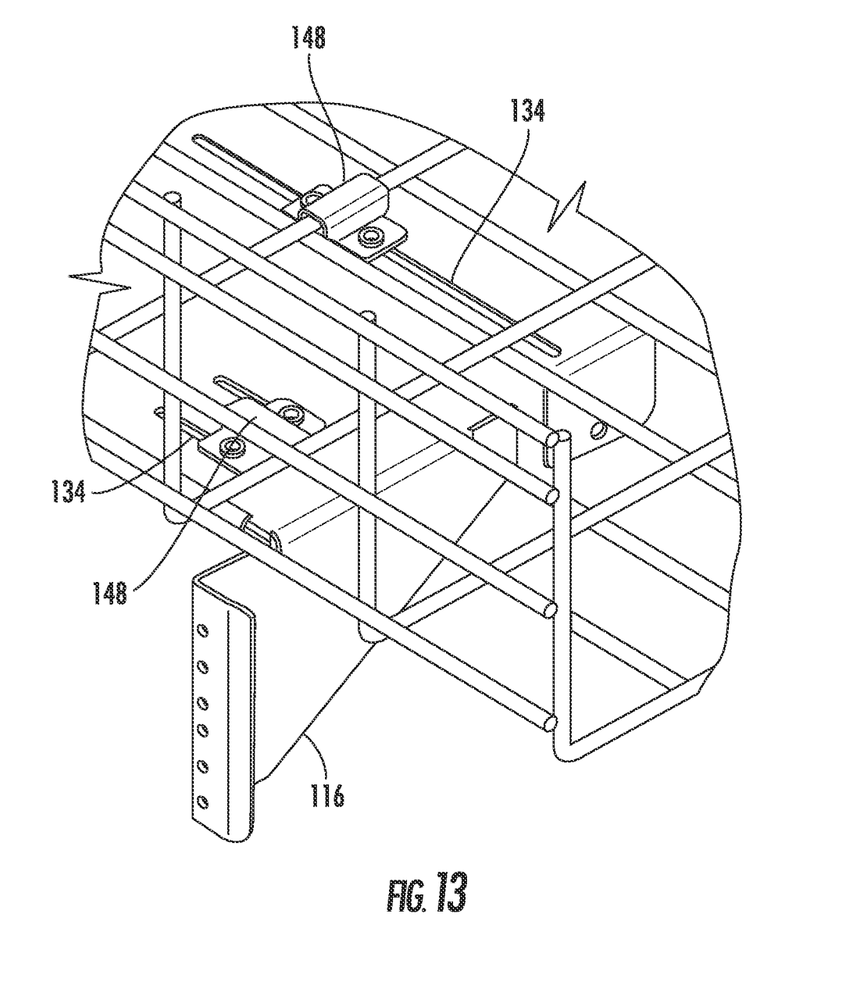
FIG. 13 is a partial view of the support frame of FIGS. 9 and 10 attached to a wire mesh cable tray using attachment clips.

In the event that the cable tray 114 is a wire mesh tray, attachment clips may be used to attach the tray bracket 118. FIG. 13 illustrates a support frame 116 attached to a wire mesh the cable tray 114. For clarity, the fiber optic equipment 112 is not shown in FIG. 13, but it should be understood that the fiber optic equipment 112 would attach to the support frame 116 in the same manner as described above with reference to FIGS. 9 and 10. In FIG. 13, the attachment clips 148 would install over a portion of the wire mesh of the cable tray 114 and attach to the mounting slots 134 in the support frame 116 using screws inserted through attachment holes in the attachment clips 148. In a similar fashion to the tray bracket 118, the mounting slots 134 allow the attachment clips to be adjustably positioned with respect to the support frame 116 to align with the wire mesh of the cable tray 114.

Many modifications and other embodiments will come to mind to one skilled in the art having the benefit of the teachings presented in the foregoing descriptions and the associated drawings.

Therefore, it is to be understood that the description is not to be limited to the specific embodiments disclosed and that modifications and other embodiments are intended to be included within the scope of the appended claims. It is intended that the description cover the modifications and variations provided they come within the scope of the appended claims and their equivalents. Although specific terms are employed herein, they are used in a generic and descriptive sense only and not for purposes of limitation.

What is claimed is:

1. A mounting assembly for mounting fiber optic equipment to a cable tray, comprising:
    a support frame adapted to attach to fiber optic equipment; and
    a mounting device attached to the support frame, wherein the mounting device is adapted to removably attach the support frame and, thereby, the fiber optic equipment to the cable tray, and wherein the mounting device is a mounting plate having a front side and a back side, and wherein the mounting plate has at least one mounting self-clinching fastener extending from the front side, and adapted to be received in a keyhole, and wherein the fiber optic equipment removably attaches to the mounting plate by inserting the at least one mounting self-clinching fastener into the keyhole in the fiber optic equipment.

2. The mounting assembly of claim 1, further comprising, an attachment plunger positioned through the mounting plate between the front side and the back side; and
    a mounting tab extending towards the back side, wherein the plunger provides pressure on a cable tray to clamp the cable tray between the plunger and the mounting tab to removably attach the mounting plate to the cable tray at the back side.

3. A mounting assembly for fiber optic equipment, comprising:
    a mounting plate adapted to attach to a cable tray;
    a support frame adapted to connect to fiber optic equipment and configured to removably attach to the mounting plate, and
    at least one lock bracket,
    wherein the mounting plate comprises at least one mounting tab, and wherein the at least one lock bracket and the at least one mounting tab attach the mounting plate to the cable tray by clamping a portion of the cable tray between the at least one lock bracket and the mounting tab using a fastener, and
    wherein when the support frame is removably attached to the mounting plate when attached to the cable tray, the cable tray supports the fiber optic equipment connected to the support frame.

4. The mounting assembly of claim 3, wherein the mounting plate includes a plate keyhole and the support frame includes a frame self-clinching fastener, and wherein the frame self-clinching fastener is configured to insert into the plate keyhole to removably attach the support frame to the mounting plate.

5. The mounting assembly of claim 3, wherein the mounting plate comprises at least one plate self-clinching fastener and the support frame includes at least one frame keyhole, and wherein the at least one plate self-clinching is configured to insert into the at least one frame keyhole to removably attach the support frame to the mounting plate.

6. The mounting assembly of claim 3, further comprising an adjustable bracket assembly, wherein the adjustable bracket assembly attaches to the fiber optic equipment and to the cable tray.

* * * * *